J. F. O'CONNOR.
ANTIFRICTION SIDE BEARING FOR RAILWAY CARS.
APPLICATION FILED APR. 29, 1910.
983,080.
Patented Jan. 31, 1911.
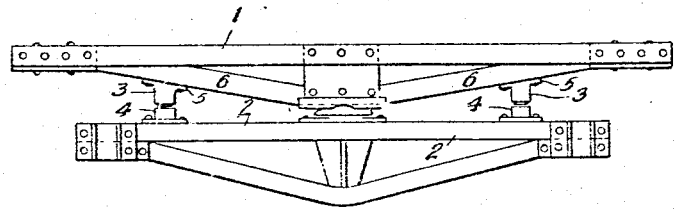
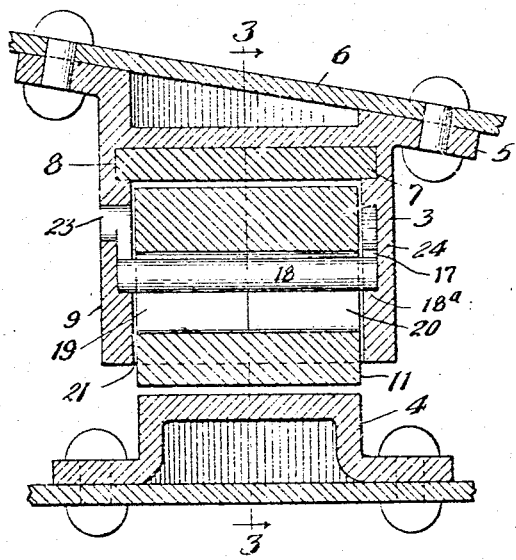
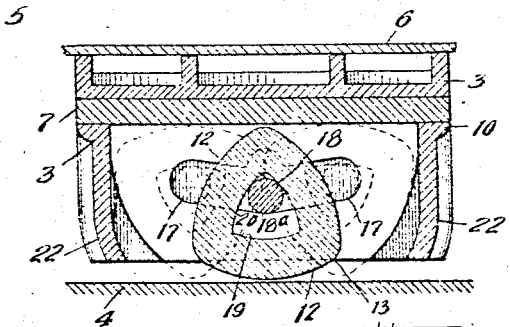
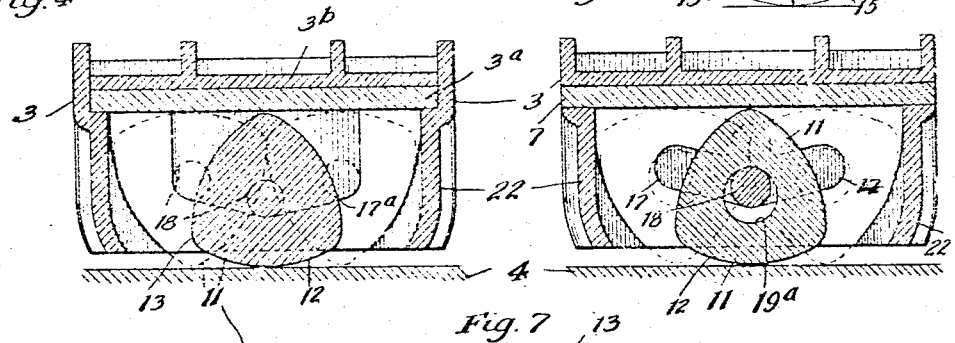
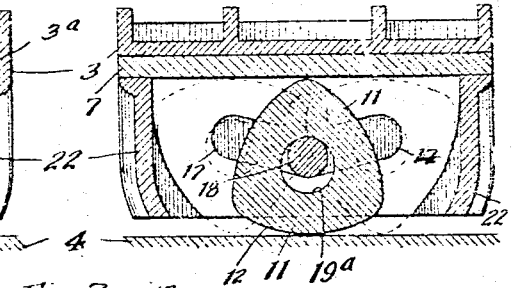
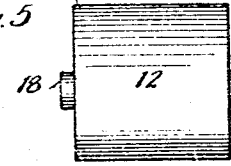
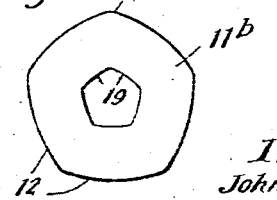
Witnesses:
Wm Geiger
Pearl Ahrens
Inventor:
John F. O'Connor
By Munday, Evarts, Adcock & Clarke
Attorneys

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

ANTIFRICTION SIDE BEARING FOR RAILWAY-CARS.

983,080.  Specification of Letters Patent.  Patented Jan. 31, 1911.

Application filed April 29, 1910.  Serial No. 558,322.

*To all whom it may concern:*

Be it known that I, JOHN F. O'CONNOR, a citizen of the United States, residing in Chicago, in the county of Cook and State of Illinois, have invented a new and useful Improvement in Antifriction Side Bearings for Railway-Cars, of which the following is a specification.

My invention relates to improvements in anti-friction bearings, and more particularly anti-friction side bearings for railway cars.

The object of my invention is to provide an anti-friction bearing of a strong, simple, efficient and durable construction, composed of few parts, capable of being easily assembled, and in which the anti-friction member will be self centering or capable of automatically returning to its central or normal position by its own gravity.

My invention consists in connection with upper and lower bearing plates, for example, side plates secured to the truck and body bolsters of a car, of an anti-friction member of a curved polygonal form of substantially uniform vertical dimension in all positions of rotation or through the different centers about which its several pairs of opposing curved faces are struck, so that when rolling between the bearing plates it will have no tendency to separate them or raise the load; said anti-friction member having a plurality of pairs of opposing and concentrically curved bearing faces of different radii, the sum of any two diametrically opposite radii being constant or always the same and equaling the uniform vertical dimension or uniform central cross dimension of the polygonal curved faced anti-friction member drawn through any of the centers about which its concentric curved faces are struck.

It further consists in connection with the bearing plates and the curved faced polygonal anti-friction member, of inclined guides on one of the bearing plates and a cooperating guide pin or device connected to or engaging the anti-friction member and traveling in said inclined guides to cause the anti-friction member to automatically return or restore the anti-friction member to its central or normal position when relieved from load.

It further consists in the novel construction of parts and devices and in the novel combinations of parts and devices herein shown and described.

In the accompanying drawing forming a part of this specification, Figure 1 is an elevation showing truck and body bolsters of a car furnished with anti-friction bearings embodied in my invention. Fig. 2 is a detail vertical section lengthwise of the bolsters through one of the anti-friction members. Fig. 3 is a vertical section on line 3—3 of Fig. 2. Fig. 4 is a vertical section, similar to Fig. 3, illustrating a modification in which the guide pin is made integral with the anti-friction member. Fig. 5 is a detail elevation of the anti-friction member shown in Fig. 4. Fig. 6 is a cross sectional view, similar to Fig. 3, showing a modification in which the opening in the anti-friction member to receive the guide pin is of a circular instead of a curved polygonal form, and Fig. 7 illustrates a modification in which the polygonal curved faced anti-friction member has five pairs of opposing concentrically curved bearing faces instead of three pairs, as shown in Figs. 1 to 6. Fig. 8 is a diagrammatic view of the anti-friction member.

In the drawing, 1 represents the body bolster, 2 the truck bolster of a railway car, 3 an upper bearing plate secured to the body bolster and 4 a lower bearing plate secured to the truck bolster. The upper bearing plate 3 is furnished with inclined flanges 5 to adapt it to the inclination of the truss member 6 of the body bolster and preferably with a removable tread or wear plate 7 of hardened steel fitting in suitable guides 8 formed in the depending sides 9 of the upper bearing plate 3, the same being preferably secured in position by a clenching lip 10, which may be bent over the end of the tread or wear plate 7 after it has been inserted.

11 is a curved faced polygonal anti-friction bearing member, roller or rocker of uniform vertical dimension interposed between the upper and lower bearing plates, and having a series or plurality of pairs of concentric bearing faces 12, 13 of different radii 14, 15, the sum of which is always constant and equals the diameter 16 of the anti-friction member, so that as the anti-friction member rolls between the upper and lower bearing plates, it has no tendency to separate them or lift the load, the adjacent or meeting curved bearing faces 12, 13 being tangent to each other at their points of junction.

The depending sides 9 of the upper bearing plate are furnished with inclined guides 17 for engagement with a coöperating guide pin or device 18 on or carried by the anti-friction member 11 to cause said anti-friction member to be self returning. The inclined guides 17 are preferably each in the form of a recess or groove formed in the inner faces of the depending sides 9 of the upper bearing plate 3, and the lowermost point 18$^a$ of each of these guides is at the middle of the bearing plate 3 so that the anti-friction member 11 will be automatically returned to its central or normal position when the load is relieved therefrom.

The guide pin or device 18 is preferably made in a separate piece on the anti-friction member 11 and in the form of a round pin, and the anti-friction member 11 is provided with a central opening 19 of larger size than the pin to receive it, the opening 19 being preferably of a curved, polygonal form, or having curved faces 20, concentric with the longer curved faces 12 of the anti-friction member 11, as illustrated in Figs. 2 and 3. By making the guide device or pin 18 in a separate piece from the anti-friction member 11, the anti-friction member is adapted to be inserted upwardly through the open bottom or mouth 21 of the upper bearing plate 3, and which is surrounded by the depending sides 9 and depending ends 22 of said bearing plate. And an opening 23 is formed in one of the depending sides 9 through which the removable pin 18 may be inserted after the anti-friction member 11 is in place, the separate piece tread or wear plate 7 being put in place last so that the anti-friction member 11 may be raised sufficiently in the bearing plate 3 to admit the guide pin 18. After the wear plate 7 is inserted, neither the guide pin 18 nor the anti-friction member 11 can be removed until after the wear plate 7 is taken out, as the ends of the guide pin 18 fit against the back walls 24 of the guide grooves 17. The removable tread or wear plate 7, anti-friction member 11 and removable guide pin 18 and guides 17 thus all coöperate in locking or securing the guide pin and anti-friction member in position.

In the modification illustrated in Figs. 4 and 5, the guide pin 18 is made integral with the anti-friction member 11 in the form of studs thereon, and in this construction, the upper bearing plate 3$^a$ is made of a two-part construction, or with a removable member 3$^b$ so that the anti-friction member 11 with its integral guide device in the form of integral central studs thereon may be inserted into the bearing plate 3 from above, and the inclined guides 17$^a$ being formed without any upper shoulders to the recess.

In the modification illustrated in Fig. 6, the central opening 19$^a$ in the anti-friction member 11 is made circular instead of a curved polygonal form.

In the modification illustrated in Fig. 7, the anti-friction member 11$^b$ has five pairs instead of three pairs of opposing curved bearing faces of different radii.

In operation, the anti-friction member 11 when resting on one of its outer faces comes to rest on the center of one of the larger bearing faces 12 as its center of gravity is lowest in such position. When the member 11 rests on its central trunnion or guide 18 or 18$^a$, it is balanced in any position and does not retard the rolling of trunnion 18 down the inclined guide 17. In rolling on a straight surface the path of the center of the member 11 is an undulating line having a cycle for each third of a revolution. In a side bearing, as but one sixth of a revolution in each direction is required to be made by the member 11, the action of said member when loaded and turning in either direction is similar to that of a circular roll, as all the vertical or central cross dimensions of said member are the same or equal so that its vertical height is constant in every position. If, when rolled to one side of its center or normal position, the load is removed, the member 11 will then rest on its trunnion 18 or 18$^a$ and by action of gravitation roll to the center or normal position, the direction of revolution tending to be the same as when rolled out from the central position; and this increase of extent of revolution in the same direction tends to bring a new bearing face 12 of rocker down or in engagement with the lower bearing plate 4. Each pair of bearing faces 12—13 will thus receive the same use, work or wear. When the member 11 is at rest on a horizontal plane, it will not readily roll, as to so roll requires a force to raise its center of gravity. When resting on its trunnion 18 or 18$^a$, it cannot revolve unless there is considerable clearance, between the member 11 and the bearing plate 3 or 4. The member 11 having a tendency to come to rest with the center of one of its larger arcs 12 tangent to surface of lower bearings 4, the wearing of a flat place at the center of arc 12 will have much less effect in retarding rolling action, than in the case of a circular roller of the same diameter as the member 11, as the radius of face 12 is nearly equal to the whole diameter of the member 11. The axes of the six arcs 12—13, 12—13, 12—13, which together compose the rolling surface may be converging lines as in case of a cone if great accuracy is desired; that is to say, each of the bearing faces 12—13 may be a segment of a cone instead of a segment of a cylinder.

In construction, it is preferred that the member 11 be of white iron, and the trunnion or guide pin 18 in a separate piece to be inserted loosely, in assembling. This is of advantage in simplifying the construction.

In the specification and claims the expression of substantially uniform dimension is applied to the diametric line through any of the different centers about which the opposing pairs of curved faces are struck, as contradistinguished from a line drawn through the center of gravity or geometric center of the anti-friction roller or member 11. All the lines drawn through any of the centers about which the curved faces are struck are always each composed of the sum of the two radii 14, 15 and are always of course uniform and the same, and one of these centers of the roller 11 is always directly in line with the tangential or contacting points of the curved faces of the roller with the upper and lower bearing plates in whatever position the member 11 may roll or turn.

I claim:—

1. In an anti-friction side bearing, the combination with upper and lower bearing plates, of an interposed polygonal curved faced anti-friction member of substantially uniform vertical dimension in all positions of rotation of said member, said anti-friction member having a series of pairs of opposing curved concentric bearing faces of different radii, substantially as specified.

2. In an anti-friction side bearing, the combination with upper and lower bearing plates, of an interposed polygonal curved faced antifriction member of substantially uniform vertical dimension, and having a series of pairs of opposing curved concentric bearing faces of different radii, said anti-friction member having a guide device, and inclined guides engaging said guide device on said anti-friction member to cause it to automatically return to central or normal position, substantially as specified.

3. In an anti-friction bearing, the combination with opposing bearing plates, of an interposed polygonal curved faced anti-friction member of substantially uniform vertical dimension in all positions of rotation of said member between said bearing plates, said anti-friction member having a plurality of pairs of opposing concentrically curved bearing faces of different radii, substantially as specified.

4. In an anti-friction bearing, the combination with opposing bearing plates, of an interposed polygonal curved faced anti-friction member of substantially uniform vertical dimension, and having a plurality of pairs of opposing, concentrically curved bearing faces of different radii, a guide device on said anti-friction member and coöperating inclined guide device to cause its return to central position, substantially as specified.

5. In an anti-friction bearing, the combination with opposing bearing plates, of an interposed polygonal curved faced anti-friction member of substantially uniform vertical dimension, and having a plurality of pairs of opposing, concentrically curved bearing faces of different radii, one of said bearing plates having depending sides furnished with inclined guides, and provided with a removable wear plate and a removable guide pin adapted to be inserted through said anti-friction member and through one of the depending sides of said bearing plate, substantially as specified.

6. In an anti-friction bearing, the combination with opposing bearing plates, of an interposed polygonal curved faced anti-friction member of substantially uniform vertical dimension, and having a plurality of pairs of opposing, concentrically curved bearing faces of different radii, one of said bearing plates having depending sides furnished with inclined guides and provided with a removable wear plate, and a removable guide pin adapted to be inserted through said anti-friction member and through one of the depending sides of said bearing plate, said anti-friction member having a polygonal curved faced opening for reception of said guide pin, substantially as specified.

7. In an anti-friction side bearing for railway cars, the combination of a lower bearing plate 4, of an upper bearing plate 3 having a removable wear plate 8, and depending sides 9 furnished with inclined guides, of a polygonal curved faced anti-friction member 11 of substantially uniform vertical dimension, and having a plurality of pairs of concentric curved bearing faces of different radii, and provided with a central opening and a guide pin of smaller size than said opening extending through said anti-friction device and engaging said inclined guides on said depending sides of said upper bearing plate, substantially as specified.

8. In an anti-friction side bearing for railway cars, the combination of a lower bearing plate 4, of an upper bearing plate 3 having a removable wear plate 8, and depending sides 9 furnished with inclined guides, of a polygonal curved faced anti-friction member 11 of substantially uniform vertical dimension, and having a plurality of pairs of concentric curved bearing faces of different radii, and provided with a central opening and a guide pin of smaller size than said opening extending through said anti-friction device and engaging said inclined guides on said depending sides of said upper bearing plate; one of said depending sides having an opening therein for insertion of said guide pin, substantially as specified.

JOHN F. O'CONNOR.

Witnesses:
H. M. MUNDAY,
PEARL ABRAMS.